Jan. 13, 1959  E. HOFFMEISTER  2,867,904
DRILLING OR GRINDING TOOLS, MORE PARTICULARLY FOR DENTAL PURPOSES
Filed May 19, 1955
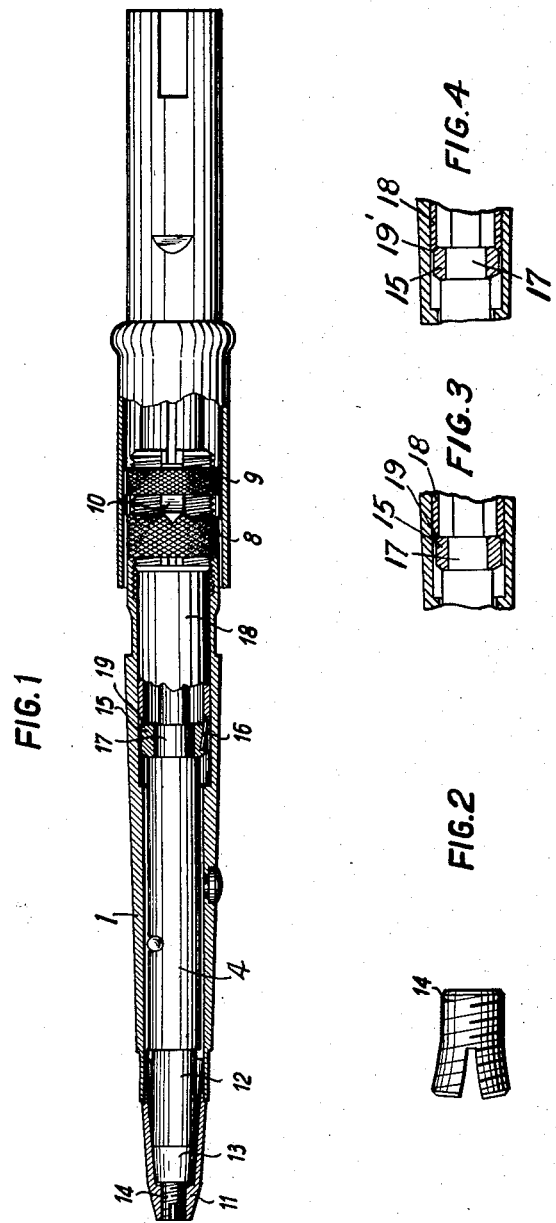
INVENTOR
E. Hoffmeister
ATTYS United States Patent Office 2,867,904
Patented Jan. 13, 1959

2,867,904

DRILLING OR GRINDING TOOLS, MORE PARTICULARLY FOR DENTAL PURPOSES

Erich Hoffmeister, Biberach-Riss, Germany

Application May 19, 1955, Serial No. 509,585

Claims priority, application Germany January 20, 1955

7 Claims. (Cl. 32—26)

This invention relates to a hand piece, more particularly for dental purposes, with a spindle sleeve which is supported in a cone bearing in the point of the hand piece and is adjustable axially with respect to the external slidable part by means of an adjusting sleeve.

In hand pieces of this kind the hand piece point is made of hardened steel, whilst the spindle sleeve is made of soft steel and is provided at its forward end with a small cone, which is suitably machined and made to fit the said cone bearing by grinding it in. The forward end of the spindle sleeve is also provided with a longer bearing cone which directly adjoins the said small cone and is fitted with an oil clearance in a second cone bearing in the point of the hand piece. At its rear end the spindle sleeve is supported in a bearing bush which is forced with a close fit into the handle sheath of the instrument.

The axial adjustment of the spindle sleeve is effected through the external sliding part by displaceable threaded rings, the displacement of which is secured after final adjustment of the spindle sleeve by means of a projection which secures the actual adjusting nut against turning.

It has been found, that in the known hand pieces of this kind with the considerably increased speeds of revolution nowadays required more particularly for grinding operations, inadmissible heating of the bearings is liable to occur.

The invention has for its object so to improve the bearing support of the spindle sleeve that even at spindle sleeve revolutions of over 15,000 per min. and more, no inadmissible heating of the bearings can occur.

With this object in view, according to the invention, the forward end face of the spindle sleeve is formed as a flat surface and bears against the inner end face of a thrust bearing ring, which is screwed into the point of the hand piece in an axially adjustable manner, the small cone at the forward end of the spindle sleeve and the cooperating cone bearing in the point of the hand piece, hitherto employed, being dispensed with. By screwing the said thrust bearing ring into the point of the hand piece to the required extent, accurate adjustment of the said oil clearance between the said bearing cone on the spendle sleeve and the corresponding cone bearing in the point of the hand piece can be effected.

The point of the hand piece and the forward end of the spindle sleeve may consist of hardened steel or may be hard-chromium plated. In the hitherto known constructional form a hard-chromium plating of the cone at the forward end of the spindle sleeve was not possible, as otherwise during assembly the hitherto provided small cone could not have been machined, fitted in and ground in.

A further improvement of the supporting means of the spindle sleeve as compared with the known hand pieces of this kind is obtained by the expedient, that the rear bearing of the spindle sleeve is mounted on a spindle sleeve part of reduced diameter and is secured with respect to the latter against turning by a projection engaging in the forward end of the adjusting sleeve.

As in the known hand piece, the axial adjustment of the spindle sleeve is effected by means of displaceable threaded rings in combination with a projection for preventing any undesired turning of the adjusting nut.

A special advantage of the novel hand piece construction may be found in this, that, should the parts become worn, the spindle sleeve and the rear bearing bush can be easily exchanged by the mechanic or some small repairing shop, without involving the troublesome knocking out of the rear bearing bush of the spindle sleeve, which has hitherto been firmly forced into the handle sleeve of the instrument.

In the accompanying drawing is illustrated a hand piece constructed in accordance with the invention.

Figure 1 is a longitudinal section, partly in longitudinal elevation, of a hand piece according to the invention;

Figure 2 is a longitudinal elevation, on a larger scale, of a detail, and

Figures 3 and 4 are part longitudinal sections of the hand piece corresponding to Figure 1, showing two different embodiments of a detail.

Referring to the drawing, 1 is the outer handle sheath of the hand piece and 11 is the hand piece point. Within the sheath 1 is housed a spindle sleeve 4 the forward end of which is provided with a bearing cone 13 which is fitted with an oil clearance in a cone bearing in the point 11 of the hand piece and supports the spindle sleeve within the sheath 1 in a similar manner to the long bearing cone hitherto provided on the spindle sleeve. The forward end of the spindle sleeve 4, including the bearing cone 13, is made of hardened steel or is hard cromium plated. The hand piece point 11 is also made of hardened steel.

In the known hand piece construction, in order to locate the spindle sleeve axially to provide the requisite oil clearance for the long bearing cone, a small cone is provided at the forward end of the spindle sleeve, the said small cone being fitted into a cone bearing in the hand piece point by suitable subsequent machining and by grinding it in the cone bearing in the hand piece point, the procedure being similar to that required in the valve seating of water cocks. This has also necessitated the forward end of the spindle sleeve being made of soft steel.

In the improved hand piece shown in Figure 1, the small bearing cone on the spindle sleeve and the counter cone bearing in the hand piece point are omitted and into the forward end of the hand piece point 11 is screwed a thrust bearing ring 14 which is slotted at its forward end. The slotted forward end of the bearing ring 14 is expanded somewhat, as shown in Figure 2, which is a side elevation of the bearing ring 14 alone on a larger scale. By expanding the slotted end of the ring 14 in the manner shown, the bearing ring can be screwed to a varying extent into the forward end of the hand piece point 11 and held firmly in a self-locking manner in the thread of the point 11 after being screwed in to the required extent. The forward end face of the spindle sleeve 4 is formed as a flat surface to bear against the rear end of the thrust bearing ring 14. By varying the extent to which the bearing ring 14 is screwed into the point 11, the requisite oil clearance between the bearing cone 13 and the corresponding cone bearing in the point 11 can be accurately adjusted.

The rear end of the spindle sleeve 4 is supported in a bearing bush 15 within the sheath 1 of the instrument. Instead of the rear end of the spindle sleeve being provided with a thickened part rotating in a bearing bush which is firmly fixed in the sheath 1, as in the known hand piece construction, in the hand piece shown in Figure 1, the rear end of the spindle sleeve 4 is provided with a portion 17 of reduced diameter which rotates in the bearing bush 15. Owing to the reduced diameter of the part 17 of the spindle sleeve, the smallest possible amount of friction is set up at this bearing place and consequently heating at high speeds of revolution is greatly reduced. The bearing bush 15 is slidable axially within the sheath 1.

As in the known construction of hand piece, axial adjustment of the spindle sleeve is effected by means of an axially displaceable adjusting sleeve 18 provided with an external screw-thread upon which are screwed two internally screw-threaded rings 8 and 9, the ring 8 bearing against the rear end of the sheath 1, so that by rotating it the adjusting sleeve 18 is moved axially with respect to the sheath 1. The other ring 9 serves for retaining in position a locking key 10 which is inserted in an axial slot in the adjusting sleeve 18 after adjustment of the sleeve has been effected, the key 10 being provided with a wedge-shaped head which engages between teeth on the rear side of the first-mentioned ring 8 so as to prevent rotation of the ring 8. In the known construction, however, the forward end of the adjusting sleeve bears through the intermediary of a disc against the thickened end of the spindle sleeve, whereas the adjusting sleeve 18 shown in Figure 1 bears against the rear side of the bearing bush 15, the bearing bush 15 engaging with a projection 16 in a corresponding recess in the forward end of the adjusting sleeve 18, being thereby prevented from turning.

The forward end of the adjusting sleeve 18 is provided with a conical surface which bears against a corresponding conical surface 19 (Figure 3) on the rear side of the bearing bush 15. Instead of a conical surface, the forward end of the adjusting sleeve 18 may be provided with a spherical surface bearing against a corresponding spherical surface 19' on the rear side of the bush 15, as shown in Figure 4. The projection 16 and the corresponding recess in the adjusting sleeve 18 have been omitted from Figures 3 and 4, in order to clearly show the conical and spherical surfaces, respectively, provided on the adjusting sleeve 18, and the corresponding conical surface 19 and spherical surface 19' on the bearing bush 15 in the respective Figures 3 and 4. The conical or spherical surface on the forward end of the adjusting sleeve 18, and the conical or spherical surface 19, 19', respectively, on the rear side of the bearing bush 15 enable the spindle sleeve 4, when the instrument is being assembled, to be centered between the bearing cone 13 at the forward end of the spindle sleeve and the conical or spherical surface 19 or 19', so that perfectly smooth running of the spindle sleeve is obtained.

Owing to the forward end of the spindle sleeve 3, including the bearing cone 13, being hardened, the wear to which the cone is subjected is considerably reduced, thereby enabling the length of the cone 13 to be considerably reduced. It will in fact suffice to make the length of the cone 13 only about half that of the corresponding long bearing cone usually employed, thereby appreciably reducing the heating up of the bearing at the high spindle speeds now normally employed.

I claim:

1. A hand piece, more particularly for dental purposes, comprising in combination, an outer sheath, a hand piece point on said sheath, a spindle sleeve within said outer sheath and extending into the hand piece point, said spindle sleeve having a flat forward end face and a bearing cone and the hand piece point having a cone bearing for co-operation with said bearing cone to support the spindle sleeve within the outer sheath and hand piece point, an axially adjustable thrust bearing ring screwed into the hand piece point for co-operation with the flat forward end face of the spindle sleeve and an adjusting sleeve displaceable within the outer sheath for axially adjusting the spindle sleeve to cause the flat forward end face of the spindle sleeve to bear against the rear end of said thrust bearing ring.

2. A hand piece as defined in and claimed by claim 1, characterised in that said thrust bearing ring is slotted at its forward end and the slotted part gapes slightly so that when the thrust bearing ring is screwed into the hand piece point it is securely held therein in a self-locking manner.

3. A hand piece as defined in and claimed by claim 1, characterised in that the hand piece point and the forward end of the spindle sleeve are made of hardened steel.

4. A hand piece as defined in and claimed by claim 1, characterised in that the forward end of the spindle sleeve is hard-chromium plated.

5. A hand piece as defined in and claimed by claim 1, characterised in that the spindle sleeve comprises at its rear end a part of smaller diameter and that a rear bearing bush is housed within the outer sheath to receive said part of the spindle sleeve, said rear bearing having a projection engaging in the forward end of the adjusting sleeve for securing it against rotation.

6. A hand piece as defined in and claimed by claim 1, characterised in that the spindle sleeve comprises at its rear end a part of smaller diameter and that a rear bearing bush is housed within the outer sheath to receive said part of the spindle sleeve, said rear bearing bush having a conical surface on the rear end face thereof and the forward end of said adjusting sleeve having a corresponding conical surface as for co-operation with the conical surface on the rear bearing bush.

7. A hand piece as defined in and claimed by claim 1, characterised in that the spindle sleeve comprises at its rear end a part of smaller diameter and that a rear bearing bush is housed within the outer sheath to receive said part of the spindle sleeve, said rear bearing bush having a spherical surface on the rear end face thereof and the forward end of the said adjusting sleeve having a corresponding spherical surface for co-operation with the spherical surface on the rear bearing bush.

No references cited.